United States Patent
Zendler et al.

(10) Patent No.: US 6,357,972 B1
(45) Date of Patent: Mar. 19, 2002

(54) TOOL AND METHOD FOR CUTTING HOLES IN FILM

(75) Inventors: Jeffrey D Zendler, Pleasant Ridge, MI (US); Mark Sementilli, Windsor (CA); Marinko Mustapic, Tecumseh (CA); Dino Mancini, Amherstburg (CA); Ross G Good, Northville, MI (US); William M Buehrer, Walled Lake, MI (US); Andrew R Kavc, Rochester Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/515,778

(22) Filed: Feb. 29, 2000

(51) Int. Cl.[7] .................. B23B 51/05; B26N 29/06; B26N 3/00

(52) U.S. Cl. .................. 408/1 R; 408/204; 408/703; 408/201; 30/300; 30/310; 30/289

(58) Field of Search .................. 408/201, 204–207, 408/209, 703, 1 R; 30/300, 301, 310, 315, 316, 287, 289

(56) References Cited

U.S. PATENT DOCUMENTS

| | | | |
|---|---|---|---|
| 1,297,900 A | | 3/1919 | Patton |
| 1,647,395 A | | 11/1927 | Costello |
| 2,145,725 A | | 1/1939 | Jamieson |
| 2,779,361 A | | 1/1957 | Mckiff |
| 2,943,389 A | | 7/1960 | Dubois |
| 4,069,586 A | | 1/1978 | Skelton |
| 4,581,824 A | * | 4/1986 | Wilkens et al. ............... 30/310 |
| 4,645,390 A | * | 2/1987 | Pecha et al. ................. 30/310 |
| 4,667,411 A | | 5/1987 | McCallum |
| 4,753,558 A | | 6/1988 | Jansson |
| 4,858,317 A | * | 8/1989 | Seib et al. .................... 30/316 |
| 4,858,322 A | * | 8/1989 | Kluga ......................... 30/310 |
| 4,878,786 A | | 11/1989 | Hedgepeth |
| 5,316,418 A | | 5/1994 | Miyanaga |
| 5,649,795 A | | 7/1997 | Durham |
| 5,915,895 A | | 6/1999 | Jager et al. |

* cited by examiner

Primary Examiner—Steven C. Bishop
(74) Attorney, Agent, or Firm—Mark P. Calcaterra

(57) ABSTRACT

A cutting tool for locating an axis in a first member and cutting a sized hole in a second member overlying the first member. The cutting tool includes a base assembly and a cutter assembly which may be used independently of the base assembly. The cutter assembly includes a guide member, a cutting blade and a handle structure with a face portion. The guide member is coupled to the handle structure and extends from the face portion. The cutting blade is coupled to the handle structure such that the cutting blade extends from the face portion and is spaced radially outward of the guide member. The base assembly has a base structure, a stem member and a pilot aperture. The base structure has a first side adapted to contact the second member and a distal side adapted to contact the first member. The stem member is coupled to the distal side of the base structure and is adapted to engage a hole in the first member to locate the axis in the first member. The pilot aperture extends through at least a portion of the base assembly and sized to receive the guide member. The guide member is adapted to pierce the second member and engage the pilot aperture to locate the cutter assembly to the axis in the first member. Rotation of the handle structure is adapted to rotate the blade about the axis in the first member to form the sized hole in the second member. A method for forming a sized hole is also provided.

19 Claims, 4 Drawing Sheets

TOOL AND METHOD FOR CUTTING HOLES IN FILM

BACKGROUND OF THE INVENTION

1. Technical Field

The present invention relates generally to cutting tools and more particularly to a tool and a method for forming an accurately sized and positioned hole.

2. Discussion

In modern vehicle manufacturing plants, it is frequently necessary to apply a protective film to a portion of a vehicle, such as a painted vehicle hood or door, to prevent that portion of the vehicle from being damaged during the remainder of the assembly process and shipping. Often times, it is desirable to apply these protective films before that area of the vehicle is completely finished. In some situations, the remaining assembly operations may present a high risk of damaging the finish of the vehicle, such as those operations which require a technician to lean over or onto finished areas of the vehicle. In other situations, one or more of the remaining assembly operations may require access to or testing of a portion of the vehicle which if covered, would impair or inhibit access or testing.

One such situation concerns the installation of washer fluid nozzles to the vehicle hood wherein it is desirable to apply a protective film to the vehicle hood prior to the installation of the washer fluid nozzles. If holes are not preformed into the plastic film, the nozzle will capture the plastic film, causing the plastic film to tear and leave strings of plastic which are trapped under the nozzle.

Die-cutting holes in the film tends to be costly and has a disadvantage wherein the holes must be accurately aligned to the holes in the vehicle hood. Mislocating the film permits the nozzle to at least partially capture the plastic film and creates a gap between the film and the nozzle which exposes the vehicle hood.

Manual cutting of the holes also has several drawbacks. One drawback relates to the accuracy of the size and placement of the holes and presents problems similar to mislocating a film with die-cut holes. Another drawback relates to the risk of damaging the vehicle hood while cutting the film after it has been applied to the vehicle hood. Scratches, knicks and cuts frequently necessitate costly and time consuming repair work.

SUMMARY OF THE INVENTION

It is one object of the present invention to provide a cutting tool which may be accurately positioned relative to a predetermined axis to form a sized hole.

It is another object of the present invention to provide a cutting tool which may be employed to form a sized hole in a second member overlying a first member wherein the sized hole is aligned to a predetermined axis in the first member.

Is yet another object of the present invention to provide a method for forming a sized hole in a second member overlying a first member wherein the sized hole is aligned to a predetermined axis in the first member.

In one form the present invention provides a cutting tool for locating an axis in a first member and cutting a sized hole in a second member overlying the first member. The cutting tool includes a base assembly and a cutter assembly which may be used independently of the base assembly. The cutter assembly includes a guide member, a cutting blade and a handle structure with a face portion. The guide member is coupled to the handle structure and extends from the face portion. The cutting blade is coupled to the handle structure such that the cutting blade extends from the face portion and is spaced radially outward of the guide member. The base assembly has a base structure, a stem member and a pilot aperture. The base structure has a first side adapted to contact the second member and a distal side adapted to contact the first member. The stem member is coupled to the distal side of the base structure and is adapted to engage a hole in the first member to locate the axis in the first member. The pilot aperture extends through at least a portion of the base assembly and sized to receive the guide member. The guide member is adapted to pierce the second member and engage the pilot aperture to locate the cutter assembly to the axis in the first member. Rotation of the handle structure is adapted to rotate the blade about the axis in the first member to form the sized hole in the second member. A method for using the cutting tool of the present invention is also provided.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
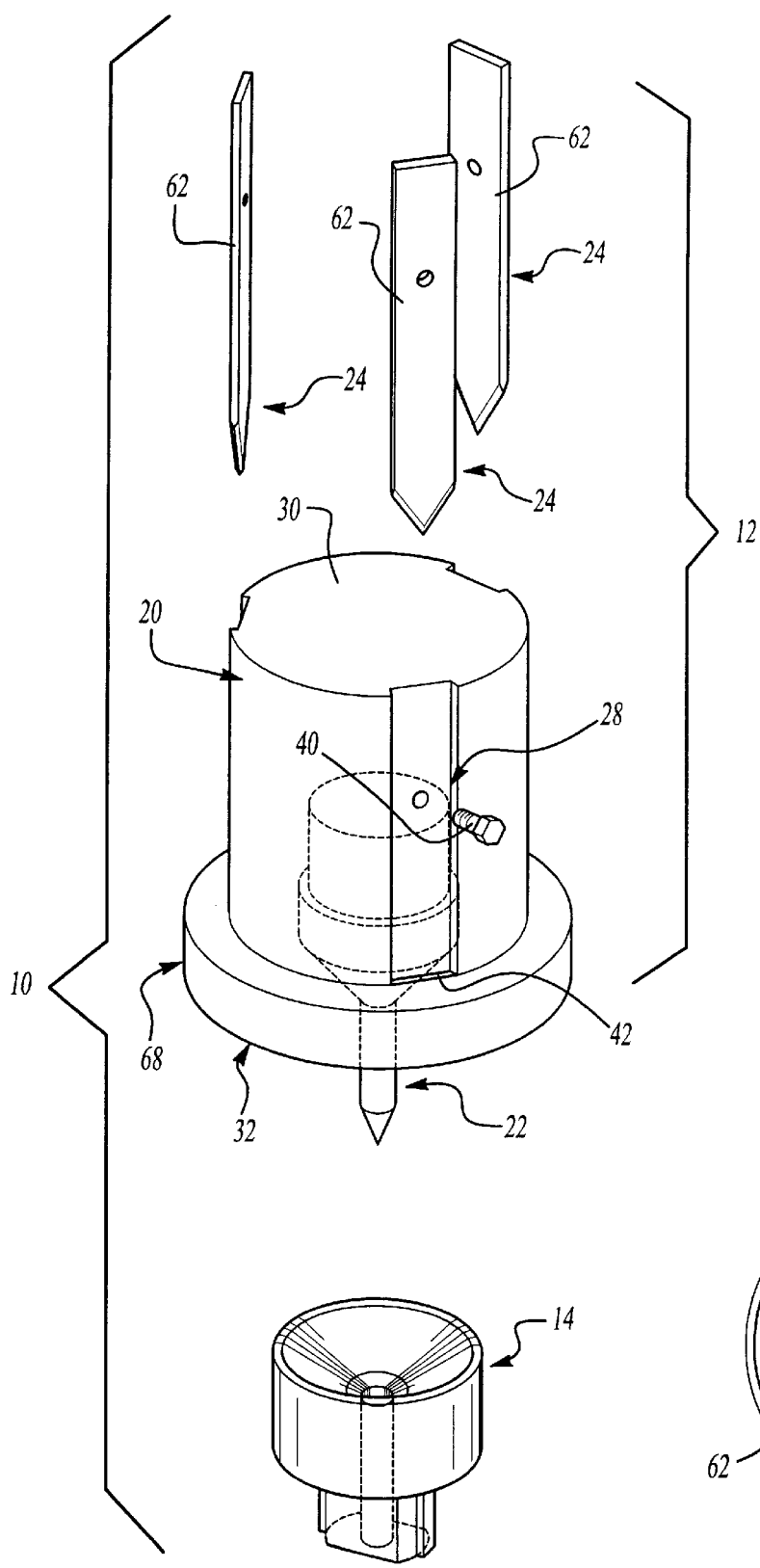
FIG. 1 is an exploded perspective view of a cutting tool constructed in accordance with the teachings of the present invention.

With reference to FIG. 1 of the drawings, a cutting tool constructed in accordance with the teachings of the present invention is generally indicated by reference numeral 10. Cutting tool 10 is shown to include a cutter assembly 12 and a base assembly 14. Cutter assembly 12 may be used independently from base assembly 14 to form a sized hole in a member, such as paper, cardboard or plastic film. Cutter assembly 12 may also be used with base assembly 14 to form a sized hole in an upper member that is positioned accurately to an axis in a first member.

Figure 2:
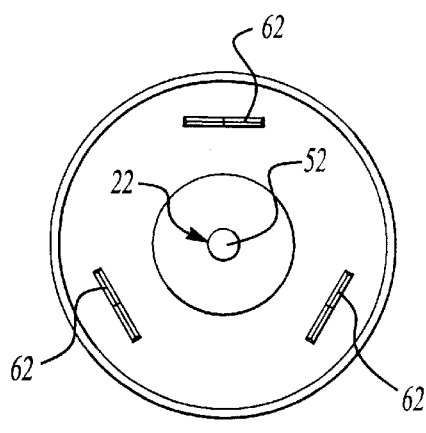
FIG. 2 is a bottom view of the cutter assembly of FIG. 1.
Figure 3:
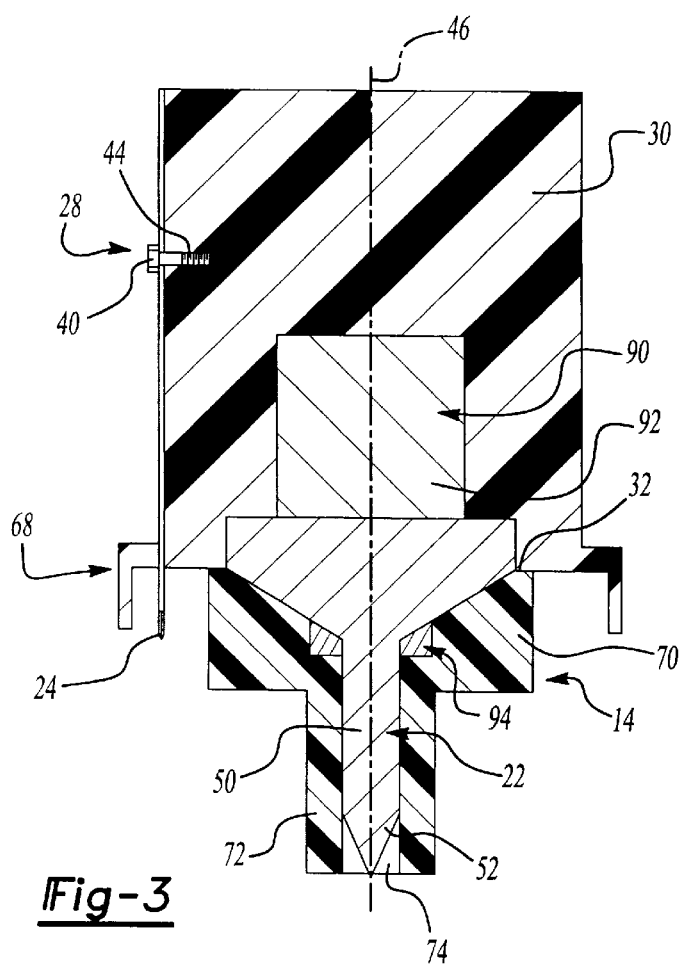
FIG. 3 is a cross-sectional view of the cutting tool of FIG. 1 taken about the longitudinal centerline of the cutting tool.

With additional reference to FIGS. 2 and 3, cutter assembly 12 is shown to include a handle structure 20, a guide member 22 and at least one cutting blade 24. Handle structure 20 includes blade retaining means 28 and a handle member 30 having a face portion 32. In the particular embodiment illustrated, blade retaining means 28 includes a threaded member 40, a blade aperture 42 and a threaded aperture 44, both of which are formed in handle member 30. Blade aperture 42 is operable for receiving cutting blade 24 and is disposed along an axis that is parallel the longitudinal axis 46 of handle member 30. Threaded aperture 44 is shown to intersect blade aperture 42. Threaded member 40, which may be a conventional screw 48, threadably engages threaded aperture 44 and exerts a clamping force onto cutting blade 24 to retain cutting blade 24 at a desired position in handle member 30. Preferably, handle member 30 is formed in a molding process.

Guide member 22 is coupled to handle structure 20 and extends from face portion 32 along axis 46. Guide member 22 includes a generally cylindrical body portion 50 and a conically-shaped tip portion 52. Guide member 22 may be formed from plastic or steel but is preferably formed from a stainless steel. Preferably, guide member 22 is molded into handle member 30.

Figure 4:
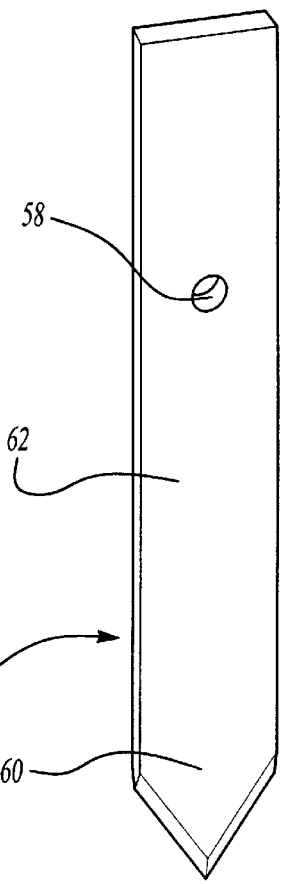
FIG. 4 is a side view of the cutting blade.

Blade retaining means 28 couples cutting blade 24 to handle structure 20 such that cutting blade 24 extends from face portion 32 and is spaced radially outward of guide member 22. With additional reference to FIG. 4, cutting blade 24 may include a mounting aperture 58 through which screw 48 extends. Cutting blade 24 preferably includes a V-shaped tip 60 which permits cutter assembly 12 to cut in both clockwise and counter-clockwise directions. Cutting blade 24 is also preferably a perishable and replaceable razor blade 62.

Cutter assembly 12 may also include a guard member 68. In the embodiment illustrated, guard member 68 is coupled to handle structure 20, being spaced radially outward of cutting blade 24 and extending outwardly from face portion 32 beyond cutting blade 24. Configuration in this manner guards users against injury when handling cutter assembly 12 but does not impair the performance of cutting tool 10 when cutter assembly 12 is used to form a sized hole in an upper member that is positioned accurately to an axis in a first member.

Figure 5:
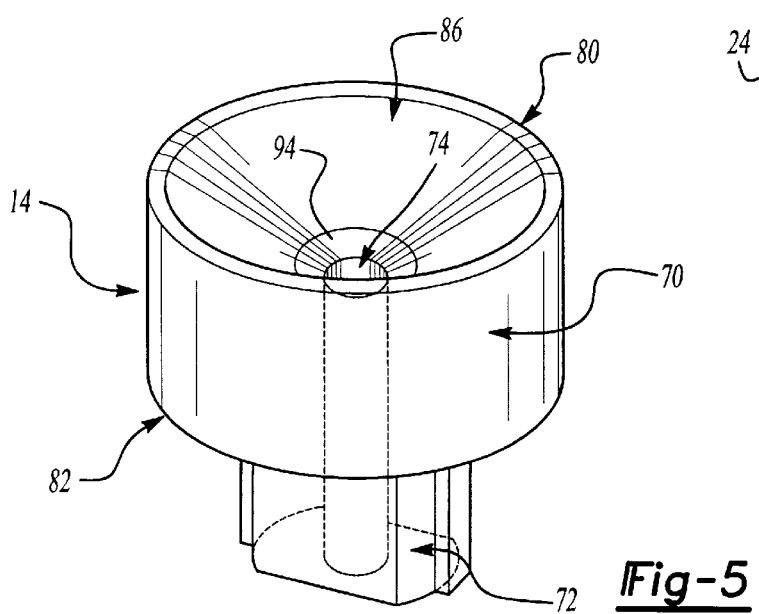
FIG. 5 is a perspective view of the base assembly.

In FIGS. 3 and 5, base assembly 14 is shown to include a base structure 70, a stem member 72 and a pilot aperture 74. Base structure 70 includes a first and second abutting surfaces 80 and 82, respectively. In the particular embodiment illustrated, first abutting surface 80 is shown to have a tensioning portion 86 with an inverted conical shape. Second abutting surface 82 is generally flat in the embodiment illustrated, but can be shaped as necessary to conform to a desired surface.

Stem member 72 is coupled to second abutting surface 82 and extends perpendicular therefrom. Stem member 72 may be cylindrical in shape or may be shaped as necessary to conform to a desired aperture. In the particular embodiment illustrated, stem member 72 has a cross-shaped cross-section. Pilot aperture 74 extends through at least a portion of the base assembly 14 and is sized to receive guide member 22. In the particular embodiment illustrated, pilot aperture 74 is generally cylindrical and extends completely through base assembly 14.

Preferably, cutting tool 10 also includes a coupling means 90 for coupling cutter assembly 12 and base assembly 14 together. Coupling means 90 may be a threaded connection between cutter assembly 12 and base assembly 14 wherein, for example, the tip portion 52 of guide member 22 threadably engages a threaded portion of pilot aperture 74. However, in the embodiment illustrated, coupling means 90 includes a magnet 92 and a steel insert 94. Magnet 92 is disposed within handle member 30 and steel insert 94 is disposed within base structure 70. The magnetic force produced by magnet 92 is transmitted through guide member 22 where it is received by steel insert 94. The magnetic force releasably couples cutter assembly 12 and base assembly together. Preferably, magnet 92 is molded into handle member 30 and steel insert 94 is molded into base structure 70.

Figure 6:
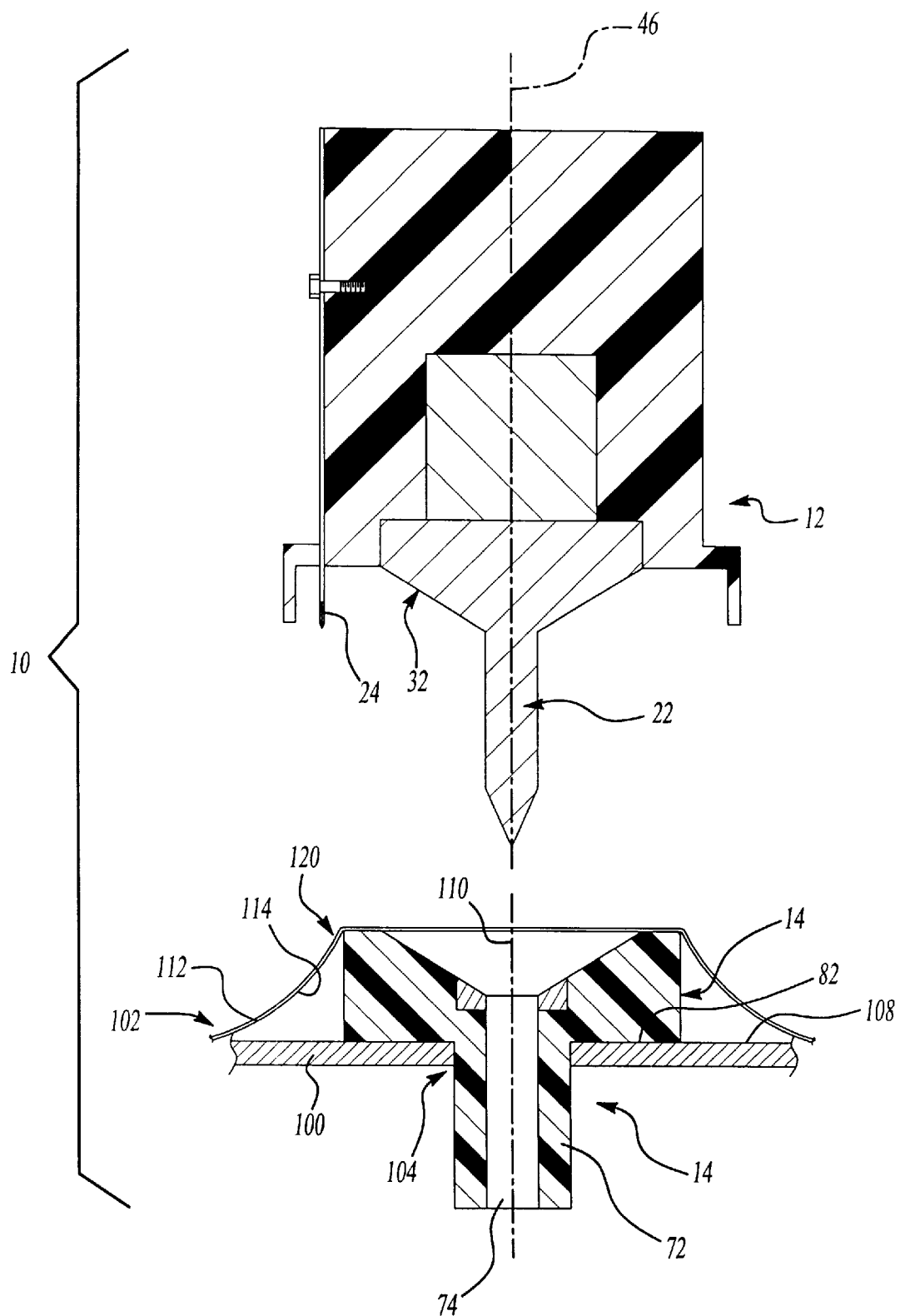
FIG. 6 is a cross-sectional view of the cutting tool of FIG. 1 in operative association with a vehicle hood and a protective plastic film prior to the insertion of the cutting tool through the protective plastic film.
Figure 7:
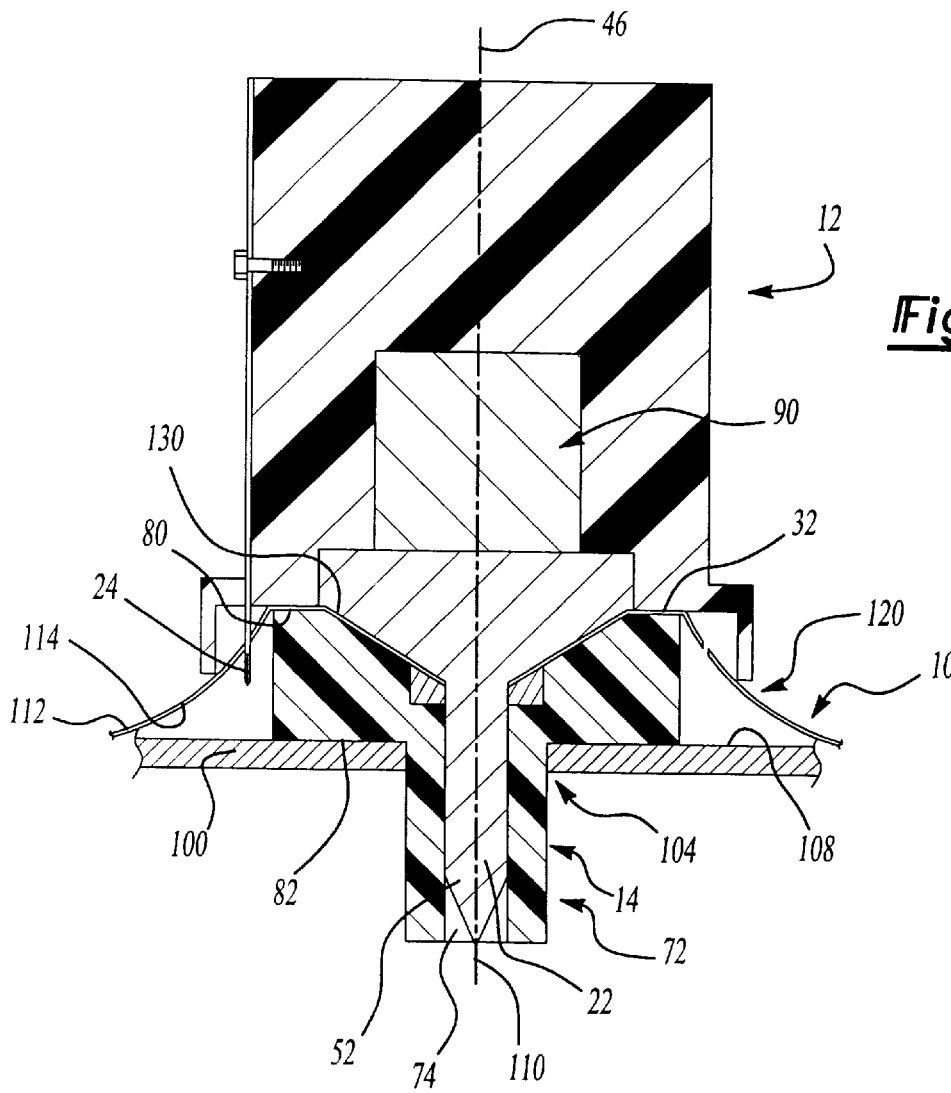
FIG. 7 is a cross-sectional view of the cutting tool of FIG. 1 in operative association with a vehicle hood and a protective plastic film after the insertion of the cutting tool through the protective plastic film.

In FIG. 6, cutting tool 10 is shown in operative association with a vehicle hood 100 and a plastic film 102. Base assembly 14 is initially installed by inserting stem member 72 into a nozzle aperture 104 in vehicle hood 100 and bringing second abutting surface 82 into contact with the exterior surface 108 of vehicle hood 100. Stem member 72 is sized to align pilot aperture 74 to a predetermined axis 110 in vehicle hood 100.

Plastic film 102 includes a film layer 112 and an adhesive layer 114. Plastic film 102 is next overlaid onto vehicle hood 100 such that adhesive layer 114 contacts exterior surface 108. As base structure 70 protrudes from exterior surface 108, the portion 120 of the plastic film 102 proximate base structure 70 "tents" above vehicle hood 100, giving the portion 120 of the plastic film 102 a frusto-conical shape.

Figure 8:
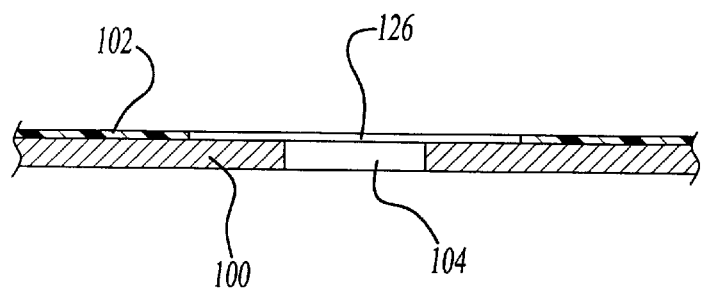
FIG. 8 is a cross-sectional view of the protective plastic film after a hole has been formed in the protective plastic film and the cutting tool has been removed.

Cutter assembly 12 is next positioned proximate base assembly 14. Guide member 22 is forced through plastic film 102 and positioned in pilot aperture 74 to locate cutter assembly 12 to axis 110 in vehicle hood 100. Cutter assembly 12 is pressed toward base assembly 14 and face portion 32 is brought into contact with first abutting surface 80. Preferably, face portion 32 and first abutting surface 80 cooperate to apply a tensile force to the portion 120 of the plastic film 102 which lifts the plastic film 102 upwardly toward cutting blade 24. Handle structure 20 is then rotated, causing cutting blade 24 to cut a sized hole 126 in plastic film 102 as shown in FIG. 8.

Coupling means 90 retains cutter assembly 12 and base assembly 14 together such that cutting tool 10 may be unitarily withdrawn from vehicle hood 100 after sized hole 126 has been cut in plastic film 102. Cutter assembly 12 may thereafter be separated from base assembly 14 so that the slug 130 produced when sized hole 126 was cut can be removed from one of the guide member 22 and the base structure 70.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

We claim:

1. A cutting tool for cutting a sized hole in a member, the cutting tool comprising:
   a handle structure having a face portion;
   a guide member coupled to the handle structure and extending from the face portion; and
   a cutting blade coupled to the handle structure, the cutting blade extending from the face portion and spaced radially outward of the guide member;
   wherein the guide is adapted to locate the cutting blade relative to a predetermined axis through the member and rotation of the handle structure is adapted to rotate the blade about the axis to form the sized hole in the member and wherein the cutting blade is a perishable and replaceable razor blade.

2. The cutting tool of claim 1, wherein the cutting blade has a V-shaped tip which is adapted to cut in a clockwise direction and a counter-clockwise direction.

3. The cutting tool of claim 1, wherein the handle structure includes a threaded member and a handle member, the handle member having a blade aperture and a threaded aperture, the blade aperture receiving the cutting blade and disposed along an axis that is parallel a longitudinal axis of the handle member, the threaded aperture intersecting the blade aperture, the threaded member threadably engaging the threaded aperture and exerting a clamping force onto the cutting blade to retain the cutting blade at a desired position in the handle member.

4. A cutting tool for cutting a sized hole in a member, the cutting tool comprising:
  a handle structure having a face portion;
  a guide member coupled to the handle structure and extending from the face portion;
  a cutting blade coupled to the handle structure, the cutting blade extending from the face portion and spaced radially outward of the guide member;
  a guard member coupled to the handle structure, the guard member spaced radially outward of the cutting blade and extending from the face portion beyond the cutting blade;
  wherein the guide is adapted to locate the cutting blade relative to a predetermined axis through the member and rotation of the handle structure is adapted to rotate the blade about the axis to form the sized hole in the member.

5. A cutting tool for locating an axis in a first member and cutting a sized hole in a second member overlying the first member, the cutting tool comprising:
  a cutter assembly including a handle structure, a guide member and a cutting blade, the handle structure having a face portion, the guide member coupled to the handle structure and extending from the face portion, the cutting blade coupled to the handle structure, the cutting blade extending from the face portion and spaced radially outward of the guide member; and
  a base assembly having a base structure, a stem member and a pilot aperture, the base structure having a first side adapted to contact the second member and a distal side adapted to contact the first member, the stem member coupled to the distal side of the base structure and adapted to engage a hole in the first member to locate the axis therein, the pilot aperture extending through at least a portion of the base assembly and sized to receive the guide member;
  wherein guide member is adapted to pierce the second member and engage the pilot aperture to locate the cutter assembly to the axis in the first member and rotation of the handle structure is adapted to rotate the blade about the axis in the first member to form the sized hole in the second member.

6. The cutting tool of claim 5, further comprising a coupling means for coupling the cutter assembly and the base assembly together, the coupling means adapted to permit the cutting tool to be unitarily withdrawn from the first member after the sized hole has been cut in the second member.

7. The cutting tool of claim 6, wherein the coupling means includes a magnet which attracts the base assembly and the cutter assembly together.

8. The cutting tool of claim 5, wherein the base structure and the handle structure are adapted to cooperate to apply a tensile force to the second member which lifts the second member upwardly toward the cutting blade.

9. The cutting tool of claim 5, wherein the cutting blade has a V-shaped tip which is adapted to cut in a clockwise direction and a counter-clockwise direction.

10. The cutting tool of claim 5, wherein the cutting blade is a perishable and replaceable razor blade.

11. The cutting tool of claim 10, wherein the handle structure includes a threaded member and a handle member, the handle member having a blade aperture and a threaded aperture, the blade aperture receiving the cutting blade and disposed along an axis that is parallel a longitudinal axis of the handle member, the threaded aperture intersecting the blade aperture, the threaded member threadably engaging the threaded aperture and exerting a clamping force onto the cutting blade to retain the cutting blade at a desired position in the handle member.

12. The cutting tool of claim 11, wherein the handle member is formed from a molded plastic and the guide member is molded into the handle member.

13. The cutting tool of claim 5, wherein the guide member is formed from stainless steel.

14. The cutting tool of claim 5, further comprising a guard member coupled to the handle structure, the guard member spaced radially outward of the cutting blade and extending from the face portion beyond the cutting blade.

15. A method for forming a sized hole in an upper member of two overlying members, the method comprising the steps of:
  providing a base assembly having a base structure, a stem member and a pilot aperture, the base structure having a first side adapted to contact the first member, the stem member coupled to the first side of the base structure, the pilot aperture extending through at least a portion of the base assembly;
  inserting the stem member into a hole in a lower member of the two overlying members to locate an axis in the lower member;
  applying the upper member over the lower member and the base assembly;
  providing a cutter assembly having a handle structure, a guide member and a cutting blade, the handle structure including a face portion, the guide member coupled to the handle structure and extending from the face portion, the cutting blade coupled to the handle structure, the cutting blade extending from the face portion and spaced radially outward of the guide member;
  inserting the guide member through the upper member and into the pilot hole to locate the cutter assembly to the axis in the lower member; and
  forming the sized hole in the upper member.

16. The method of claim 15, wherein the step of forming the sized hole includes the steps of:
  rotating the cutter assembly about axis to form the sized hole in the upper member; and
  withdrawing the base assembly from the lower member to remove a slug formed when the upper member was cut.

17. The method of claim 16, wherein the handle assembly is pulled to simultaneously remove the slug and withdraw the base assembly.

18. The method of claim 17, further comprising the steps of:
  removing the base assembly from the cutter assembly;

removing the slug from one of the base structure and the guide member; and inserting the guide member to the pilot aperture and coupling the base assembly and cutter assembly together.

19. A cutting tool for locating an axis in a first member and cutting a sized hole in a second member overlying the first member, the cutting tool comprising:

a cutter assembly including a handle structure, a guide member and a cutting blade, the handle structure having a threaded member, a magnet and a handle member, the handle member having a face portion, a blade aperture and a threaded aperture, the blade aperture receiving the cutting blade and disposed along an axis that is parallel a longitudinal axis of the handle member, the threaded aperture intersecting the blade aperture, the threaded member threadably engaging the threaded aperture and exerting a clamping force onto the cutting blade to retain the cutting blade at a desired position in the handle member, the guide member formed from steel, the guide member coupled to the handle structure and extending from the face portion, the cutting blade extending from the face portion and spaced radially outward of the guide member; and a base assembly having a base structure, a steel insert, a stem member and a pilot aperture, the base structure having a first side adapted to contact the second member and a distal side adapted to contact the first member, the steel insert coupled to the first side of the base structure; the stem member coupled to the distal side of the base structure and adapted to engage a hole in the first member to locate the axis therein, the pilot aperture extending through at least a portion of the base assembly and the steel insert, the pilot aperture sized to receive the guide member;

wherein guide member is adapted to pierce the second member and engage the pilot aperture to locate the cutter assembly to the axis in the first member;

wherein rotation of the handle structure is adapted to rotate the blade about the axis in the first member to form the sized hole in the second member; and wherein a magnetic force generated by the magnet is transmitted through the guide member to the steel insert to removably couple the base assembly to the cutter assembly.

\* \* \* \* \*